United States Patent [19]

Kirkpatrick

[11] Patent Number: 4,708,858

[45] Date of Patent: Nov. 24, 1987

[54] POLYMERIZATION OF CYCLIC DIHALOPHOSPHAZENE OLIGOMERS

[75] Inventor: Charles C. Kirkpatrick, St. Louis, Mo.

[73] Assignee: The Dow Chemical Company, Midland, Mich.

[21] Appl. No.: 724,215

[22] Filed: Apr. 17, 1985

[51] Int. Cl.$^4$ .............................................. C01B 25/10
[52] U.S. Cl. .................................................. 423/300
[58] Field of Search ........................................ 423/300

[56] References Cited

U.S. PATENT DOCUMENTS

| | | | |
|---|---|---|---|
| 3,819,811 | 6/1974 | Aboutboul et al. ................. | 423/335 |
| 4,137,330 | 1/1979 | Prichard et al. .................... | 423/300 |
| 4,256,715 | 3/1981 | Kinoshita et al. .................. | 423/300 |
| 4,302,565 | 11/1981 | Goeke et al. ....................... | 502/110 |
| 4,379,134 | 4/1983 | Weber et al. ....................... | 423/628 |
| 4,459,372 | 7/1984 | Arena ................................. | 502/351 |

OTHER PUBLICATIONS

Kirk-Othmer, *Encyclopedia of Chemical Technology*, Second Edition, vol. 4 (1964), John Wiley & Sons, pp. 565–567.

Allcock, *Phosphorus–Nitrogen Compounds* (1972), Academic Press, pp. 319–321.

*Primary Examiner*—John Doll
*Assistant Examiner*—Wayne A. Langel

[57] ABSTRACT

A catalytic method for polymerizing cyclic dihalophosphazene to linear polydihalophosphazene is provided wherein the catalyst is a solid support of silica or alumina containing supported thereon both a transition metal compound and an organometallic compound.

16 Claims, No Drawings

POLYMERIZATION OF CYCLIC DIHALOPHOSPHAZENE OLIGOMERS

BACKGROUND OF THE INVENTION

This invention relates to the polymerization of cyclic dihalophosphazenes oligomers to higher molecular weight substantially linear polydihalophosphazene polymers. The polymerization of cyclic dihalophosphazenes such as $(NPCl_2)_3$ or $(NPCl_2)_4$ to higher molecular weight linear polydihalophosphazene polymers is well known in the art.

Prior known processes for polymerizing such cyclic dihalophosphazenes involved the uncatalyzed or catalyzed thermal polymerization of such dihalophosphazenes either in a bulk process or in a solution process employing a solvent. Such processes are taught, for example, in U.S. Pat. No. 3,370,020 to Allcock et al., issued Feb. 20, 1968; U.S. Pat. No. 3,515,688 to Rose, issued June 2, 1970; U.S. Pat. No. 4,005,171 to Reynard et al., issued Jan. 25, 1977; U.S. Pat. No. 4,123,503 to Snyder et al., issued Oct. 31, 1978; U.S. Pat. No. 4,327,064 to Fieldhouse et al., issued Apr. 27, 1982; U.S. Pat. No. 3,917,802 to Allcock et al., issued Nov. 4, 1975; U.S. Pat. No. 4,137,330 to Prichard et al., issued Jan. 30, 1979; U.S. Pat. No. 4,242,316 to Sinclair, issued Dec. 30, 1980; PTO Patent Specification Publication No. 0004877, published May 12, 1982, to Snyder et al.; U.S. Pat. No. 4,225,567 to Halasa et al., issued Sept. 30, 1980; U.S. Pat. No. 3,937,790 to Allcock et al., issued Feb. 10, 1976; and U.S. Pat. No. 4,226,840 to Fieldhouse et al., issued Oct. 7, 1980.

The present invention concerns an improvement over all of the prior technology by use of a specifically defined supported coordination catalyst containing both titanium and aluminum. By this method lower temperatures and reaction times are possible and starting materials can be employed which are not ultra pure.

SUMMARY OF THE INVENTION

In the practice of the present invention, cyclic dihalophosphazenes oligomers are polymerized to form polydihalophosphazenes by agitating, under an inert gaseous atmosphere, a mixture containing at least one cyclic dihalophosphazene and a polar organic solvent for the cyclic halophosphazene, in the presence of a catalytic amount of a solid catalyst which is composed of a solid support (particulated) selected from the group consisting of silica gel or alumina and supported on such support a transition metal compound and an organo metallic compound. At least a proportion of the transition metal ion has a valence of three or less. The agitated mixture is maintained at a temperature of from about 150° to about 250° C. for a sufficient period of time to form linear polydihalophosphazene and the polydihalophosphazene is recovered.

DETAILED DESCRIPTION OF THE INVENTION

The starting material or monomer of the present invention comprises one or more cyclic dihalophosphazene oligomers represented by the formula $(NPX_2)_n$ in which n is from 3 to about 7 and wherein X is a halogen selected from the group consisting of chloride, fluoride, and bromide ion. X is preferably chloride. The cyclic dihalophosphazene oligomers which are employed as starting materials are substantially pure oligomers which are obtained by purification of crude cyclic dihalophosphazene oligomers. A mixture of these cyclic dihalophosphazenes can be employed in the practice of the invention. For example, a mixture of tri- and tetracyclic dihalophosphazenes are useful. A variety of methods for purification are known in the art and include, for example, extraction, crystallization, distillation, saponification, and hydrolysis techniques. Cyclic phosphonitrilic chloride trimer or tetramer are preferred. One or more of these materials can be employed as the starting materials.

The solvent employed in the practice of the present invention comprises a material which is both unreactive to the catalyst and monomer, and preferably is a solvent for the monomer and the polymer at the polymerization temperatures employed. A polar solvent having a dielectric constant high enough to permit cationic polymerization is preferred. Examples of suitable solvents include 1,2,4-trichlorobenzene; 1,2,3-trichlorobenzene; 1,3,5-trichlorobenzene, and mixtures thereof. The solvent should preferably be used in an amount which is sufficient to form a readily agitated slurry mixture containing the particulate catalyst and the monomer. Generally, the solvent should be employed in an amount less than about 50 percent by weight of the reaction mixture.

The process is preferably carried out under an inert, dry atmosphere such as nitrogen, helium, or argon. The polymerizations may be conducted under a vacuum, atmospheric or elevated pressures.

The catalysts employed in the present invention comprises a solid support of silica gel or alumina containing supported thereon a catalytically effective amount of a transition metal compound selected from the group consisting of titanium, zirconium, hafnium, vanadium, niobium, tantalum, chromium, molybdenum, tungsten or mixture thereof. Also present on the support is an organometallic compound of aluminum or boron, represented by the formula $R_aMX_b$ wherein M is either aluminum or boron, a+b is equal to the valence of M, X is a halogen such as chloride or bromide, and R is a hydrocarbon radical selected from the group consisting of alkyl, aryl, cycloalkyl, alkaryl, and arylalkyl, wherein the group contains from $C_1$ to $C_{20}$.

The aluminum atom to transition metal atom mole ratio on the supported catalyst is important and should range from about 0.1 to about 100 aluminum to transition metal, preferably from about 1.0 to about 65, most preferably about 3 to about 8.

The transition metal compound is preferably an alkoxide or a halide such as, for example, transition metal-$(OR)_4$ and transition metal-$(OR)_3$ wherein R is selected from the group consisting of a hydrocarbon or transition metal-$X_4$ and transition metal-$X_3$ wherein X is a halogen. Preferred hydrocarbon groups are isobutyl, n-butyl, and isopropyl. The preferred halogen atom is chloride. Preferred transition metal compounds include $Ti(OCH_2CH(CH_3)_2)_4$, and $TiCl_4$ and the valence 3 form of these compounds. Preferred organometallic compounds are aluminum alkyl halides such as ethylaluminum dichloride, diethyl aluminum chloride, ethyl aluminum sesqui chloride and mixtures thereof.

A catalytically sufficient amount of the supported catalyst should be present. The catalyst, based on the active transition metal, is provided in a molar ratio to "$NPCl_2$" unit ranging from about $1\times10^{-4}:1$, to $1\times10^{-2}:1$, most preferably $8\times10^{-4}:1$ to $8\times10^{-3}:1$. It is preferred to adjust the quantity of active catalyst by changing the amount of catalyst on the support instead of the amount of support and catalyst. It has been discovered that the amount of support in the reaction mixture needs to be minimized in order to reduce the formation of gels in the polymer.

The material employed to support the transition metal compound and organometallic compound comprises alumina or silica. These supports can be prepared in any convenient manner. The supports should generally be in particulate form and range in size from about 60 to about 200 mesh (U.S. Standard Sieve Series). The alumina supports can be prepared, for example, by the method taught in U.S. Pat. No. 4,428,863, the teachings of which are incorporated herein by reference. Silica supports can be prepared, for example, by heating silica to about 500° C. under vacuum for about 5 hours and then cooling under vacuum or nitrogen. Silica supports can also be prepared according to the teachings of U.S. Pat. Nos. 4,436,882; 4,384,086; 4,369,295; 4,434,280 and 4,199,475 the teachings of which are incorporated herein by reference. Supporting the transition metal compound and organometallic compound on the silica or alumina can likewise be accomplished in any manner known in the art. For example, the method taught at column 7, line 40 through line 68 of U.S. Pat. No. 4,302,565 can be employed. Other techniques can be used.

Uniform heat distribution throughout the reaction mass should be maintained during the polymerization process. Therefore, good mixing is required to reduce crosslinking and gel formation.

The polymerization reaction may be carried out within a temperature range of from about 150° to about 250° C. A preferable temperature range is from about 200° to about 220° C.

The polymers produced according to the practice of the present invention can range in molecular weight from about 3,500 to 35,000. The molecular weight can be controlled by controlling the amount of catalyst present during the polymerization reaction. The molecular weight is determined by the technique set forth in Examples 19-28.

The reaction times will vary depending on factors such as polymerization temperatures, the amount of catalysts and the like. Polymerization times ranging from about 3 to about 6 hours are satisfactory.

It has been found that the catalyst does not need to be removed from the polydihalophosphazene polymer prior to converting the dihalophosphazene to a polyorganophosphazene such as taught in U.S. Pat. No. 3,370,020. However, if desired the catalyst may be removed from the polymer by diluting the polymer in toluene and removing the solid catalyst particles by centrifuging the mixture. Other techniques may also be employed.

In the following examples of the invention the following procedure was employed to prepare the supported catalyst. A titanium compound was reacted with either activated silica gel or alumina at a temperature of about 20° to 30° C. in hexane solvent. The silica-titanium material is then contacted at a temperature of about 20° to about 30° C. with an aluminum compound dissolved in toluene. The mixture was then heated to reflux for several hours. The solid catalyst was recovered by filtration, washed with hexane and then dried under vacuum. The silica gel or alumina is activated by known techniques such as heating to 400° to 500° C. under vacuum or nitrogen purge for about four hours and the solid cooled under vacuum or nitrogen.

EXAMPLES 1-18

A catalyst was prepared by the following procedure. Silica (60-200 mesh U.S. Standard Sieve Series) was activated and 5.90 grams slurried in 100 ml of hexane. A solution consisting of 1.00 ml (2.85 mmoles) of Ti-[OCH$_2$—CH—(CH$_3$)$_2$]$_4$ and 50 ml of hexane was added to the activated silica with vigorous stirring. The solution was stirred for one hour at room temperature. The solid was then filtered, washed with three 50 ml portions of hexane and dried under vacuum. A solution consisting of 10 ml (18 mmoles) of ethylaluminum dichloride in 50 ml of toluene was prepared and placed in a dropping funnel. The silica-supported Ti compound was then slurried in 50 ml of toluene and the ethylaluminum dichloride solution was added to the supported Ti slurry with vigorous stirring. The slurry was then warmed to reflux for two hours, cooled to room temperature and stirred overnight. The solid catalyst (brown in color) was then filtered, washed with four 50 ml portions of hexane, and dried under vacuum. At least a portion of the Ti will be reduced by the aluminum compound to a valence of +3.

Several other catalysts were prepared employing the foregoing procedure but altering the Ti source, mole ratio and support. The catalysts are described in the following Table I.

TABLE I

Composition of Supported Catalysts

| Catalyst # | Support | Ti-Source[1] | Al-Source | Concentration[2] | Al/Ti[3] |
|---|---|---|---|---|---|
| 1 | Silica | Ti(OR)$_4$ | EtAlCl$_2$ | 0.47 | 6.43 |
| 2 | Silica | TiCl$_4$ | EtAlCl$_2$ | 0.26 | 11.80 |
| 3 | Alumina | Ti(OR)$_4$ | EtAlCl$_2$ | 0.48 | 6.35 |

Notes:
[1]Ti-Source: R is iso-butyl [—CH$_2$CH(CH$_3$)$_2$].
[2]Concentration: in units of mmoles Ti/gram of support added.
[3]Al/Ti: the ratio of moles of Al added/moles of Ti added.

Employing the catalysts identified in Table I, (NPCL$_2$)$_3$ trimer was polymerized in the following manner. The catalyst employed, reaction temperature, reaction time, solvent, ratio of Ti to NPCl$_2$ and yield are set forth in the following Table II.

The polymerization was carried out by mixing the reaction components (catalyst, (NPCl$_2$)$_3$, and solvent) in a 50 ml flask in a dry box. The flask was fitted with a reflux condenser and an adaptor with a 2 mm stopcock placed on the top of the condenser. The apparatus was then removed from the dry box. A tube from a double manifold vacuum/nitrogen line was then attached to the adaptor. The tube was evacuated and refilled with nitrogen five times. The flask was then opened to the nitrogen line. Following this the flask and its contents were placed inside a heating mantle and the contents quickly heated to the reflux temperature of the solvent and the temperature maintained at reflux until the reaction was terminated. To terminate the reaction, the heat source was removed from the flask, and the apparatus allowed to cool to room temperature. The flask was then removed to the dry box and the polymerization yield was determined.

The contents of the flask after cooling to room temperature were diluted with toluene and filtered. The solids, which consisted of catalyst and crosslinked polymer (i.e., gel, which is not considered to be a useful product of this reaction) were separated from the liquid. The liquid portion was then added dropwise to hexane. A solid precipitate was formed consisting of the linear polymer. The yield was calculated based on the weight of the solids after they were separated and dried.

The results of these polymerization runs are set forth in the following Table II.

TABLE II

Results of Polymerization Runs Using Supported Catalysts

| Example No. | Catalyst #[3] | Solvent[1] | Time (hrs) | Temp (°C.) | Ratio[2] | % Yield |
|---|---|---|---|---|---|---|
| 1 | 1 | A | 1.0 | 214 | 4.9 | 15 |
| 2 | 1 | A | 2.0 | 214 | 4.8 | 53 |
| 3 | 1 | A | 3.0 | 214 | 4.8 | 74 |
| 4 | 1 | A | 4.0 | 214 | 5.0 | 85 |
| 5 | 1 | A | 5.0 | 214 | 4.7 | 88 |
| 6 | 1 | A | 6.0 | 214 | 4.9 | 82 |
| 7 | 1 | A | 6.0 | 214 | 5.0 | 83 |
| 8 | 1 | A | 6.6 | 214 | 5.0 | 76 |
| 9 | 1 | C | 3.2 | 214 | 5.0 | 83 |
| 10 | 1 | A | 5.7 | 214 | 5.0 | 81 |
| 11 | 1 | A | 4.0 | 214 | 0.72 | 54 |
| 12 | 2 | A | 5.0 | 214 | 5.0 | 80 |
| 13 | 2 | A | 5.0 | 214 | 2.8 | 67 |
| 14 | 3 | A | 1.0 | 214 | 5.0 | 25 |
| 15 | 3 | A | 2.5 | 214 | 5.0 | 33 |
| 16 | 3 | A | 4.0 | 214 | 5.1 | 68 |
| 17 | 3 | A | 5.0 | 214 | 4.9 | 73 |
| 18 | 3 | A | 6.0 | 214 | 5.1 | 73 |

Notes:
[1]Solvent:
A = 1,2,4-trichlorobenzene
C = 1.0 ml portions of 1,2,4-trichlorobenzene were added at the following intervals into the reaction: 0.20, 0.92 and 1.25 hours.
[2]Ratio: The ratio of mmoles Ti/mole NPCl$_2$
[3]Catalyst #: The catalyst composition is given in Table I.

EXAMPLES 19-35

These Examples were conducted in the same general manner as Examples 1-18 except that certain process parameters were varied. These variations are noted below or in Tables, III, IV and V.

Silica (60-200 mesh U.S. Standard Sieve Series) was activated prior to use by heating to 500° C. in a tube furnace with a slow nitrogen purge until no more steam was evolved from the tube. The tube was then evacuated for two hours at 500° C., cooled slowly to room temperature, and placed into the dry box. (NPCl$_2$)$_3$ was either used as received, recrystallized from hexane, or vacuum sublimed. The purification of this reagent appeared to have no effect on the polymerization reactions. 1,2,4-trichlorobenzene solvent (TCB) was vacuum distilled from barium oxide and stored under nitrogen prior to use. All other reagents were used as received.

All of the supported catalysts were prepared in a manner analogous to that set forth in the Examples 1-18.

A slurry of activated silica in hexane was treated with a solution of isobutyl titanate in hexane. The solution was stirred vigorously for several hours. The solid catalyst was collected by decanting the solvent, washing with hexane, and decanting the solvent again. To a slurry of this solid in hexane was added a solution of ethyl aluminum dichloride in toluene. The reaction mixture was heated to reflux for several hours and the slurry was stirred overnight. The solid catalyst was collected and dried under vacuum after several wash/decant steps with hexane. Table III sets forth the ratios of the reagents used to prepare these catalysts.

The polymerization reactions were carried out under a variety of conditions. The experimental conditions for each run are given in Table IV. All runs were performed under nitrogen.

In a number of Examples reported in Table V, derivatives of linear-phosphonitrilic chloride polymer were prepared according to standard literature procedures Allcock, H. R., Kugel, R. L., Valen K. J., "Inorganic Chemistry", 1966 5 1709. However, the isolation and purification of the product differed from previously reported procedures in the following respect. Excess sodium alkoxides and/or phenoxides were neutralized to pH≦3.0 by the dropwise addition of concentrated HCl. The polymer was then precipitated by slow addition of the reaction mixture to water with vigorous stirring. The water was decanted and the polymer was washed with excess water to remove most of the salts and organic solvents. The polymer was then washed with n-propanol, then water, and finally with n-propanol. The solvent was then decanted from the polymers. Toluene was then added and the mixture was heated to boiling. The water and n-propanol were removed as the toluene azeotropes. As the boiling point of the mixture reached 110° C., the polymer dissolved to form a viscous, cloudy solution. The solution was cooled to room temperature, poured into centrifuge tubes, and spun at 10,000 rpm for 15 minutes to remove insoluble salts and gels. The clear solution was decanted from the centrifuge tubes into a beaker. The toluene was evaporated by heating under an air purge. The final traces of solvent were removed by placing the beaker in a vacuum oven (90° C., 20 mm Hg) until a constant weight was obtained. Yields were determined gravimetrically, and are based on the moles of (NPCl$_2$) in the starting reagent (NPCl$_2$)$_3$.

Solution viscosity data is reported as the inherent viscosity, $$N_{inh} = \ln \frac{n_r}{c} \ln \frac{(t - t_o)}{(t_o)} \frac{1}{c}$$

where t is the time for the polymer solution, $t_o$ is the time for the pure solvent, and c is the concentration of polymer (grams/deciliter). All viscosity data was obtained at 25° C. using a Ubbelohde viscometer. Polymer solutions were prepared in either tetrahydrofuran or toluene. Determination of the same polymer sample in the two solvents showed less than a 5 percent difference in the viscosity values.

Approximations to Mv, the viscosity average molecular weight, were made using the Mark-Houwink equation, $$[n] = K^1 M v^a$$

with the constants $K^1 = 2.50 \times 10^{-3}$ dl·mole/g$^2$ and $a = \frac{1}{2}$, as reported by Allcock in Allcock, H. R.; Kugel, R. L.; Valen, K. J.; "Macromolecules", 1978, 11, 179.

TABLE III

| Catalyst Number | Catalyst Composition | |
|---|---|---|
| | (Ti)[1] | Al/Ti[2] |
| 4 | 0.474 | 6.43 |
| 5 | 0.047 | 64.5 |
| 6 | 0.474 | 6.43 |
| 7 | 0.479 | 6.29 |

TABLE III-continued

| Catalyst Number | Catalyst Composition (Ti)[1] | Al/Ti[2] |
|---|---|---|
| 8 | 0.479 | 11.0 |

[1]mmoles Ti/gram silica added
[2]molar ratio

TABLE IV

Yield and Viscosity Data

| Example Number[1] | Catalyst | Time[2] | Ratio[3] | Solvent[4] | Conditions[5] | Yield[6] | DSV[7] |
|---|---|---|---|---|---|---|---|
| 19 | 4 | 5.5 | 5.0 | TCB | b | — | 0.44 |
| 20 | 4 | 5.5 | 5.0 | TCB | b | — | 0.29 |
| 21 | 4 | 5.5 | 5.0 | TCB | a | 66% | 0.17 |
| 22 | 5 | 4.8 | 0.5 | TCB | a | 96% | 0.15 |
| 23 | 5 | 6.4 | 0.5 | TCB | c | 60% | 0.42 |
| 24 | 6 | 7.1 | 0.5 | TCB | b,c | 60% | 0.47 |
| 25 | 6 | 5.5 | 0.5 | TCB | c | 29% | 0.11 |
| 26 | 7 | 6.0 | 5.0 | TCB | c | 75% | 0.31 |
| 27 | 7 | 6.0 | 5.0 | TCB | b,c | 58% | 0.39 |
| 28 | 8 | 5.0 | 5.3 | TCB | c | 67% | oil |

[1]all runs were performed in refluxing solvent (214° C.)
[2]in hours
[3]mmoles Ti/mole NPCl$_2$
[4]TCB = 1,2,4-trichlorobenzene
[5]Experimental conditions as follows: a = nitrogen pad, 50% (weight) solvent; b = solvent addition as needed to keep the viscosity of the solution low enough for efficient stirring, up to a maximum of 50% (weight) solvent; c = nitrogen purge
[6]remainder gel
[7]dilute solution viscosity in deciliters/gram

TABLE V

Scale-up Reactions

| Example Number[1] | Catalyst | Starting Compound[2] | Time[3] | Derivative[4] | Yield[5] | Conditions[6(a)] |
|---|---|---|---|---|---|---|
| 29 | 4 | 30[6(b)] | 5.5 | APN | 53% | a |
| 30 | 4 | 30 | 5.5 | APN | 95% | a |
| 31 | 4 | 30 | 5.5 | APN | 80%[7] | a |
| 32 | 5 | 30 | 9.5 | APN | —[8] | a,b |
| 33 | 6 | 30 | 7.1 | APN | >50%[7] | a,b |
| 34 | 6 | 30 | 5.5 | APN | 29% | b |
| 35 | 7 | 100 | 6.0 | APN | 58% | a,b |

[1]all reactions were performed in refluxing 1,2,4-trichlorobenzene (214° C.)
[2]grams of (NPCl$_2$)$_3$
[3]in hours
[4]APN is [NP(OC$_6$H$_5$) (OC$_6$H$_4$—4-C$_2$H$_5$)]$_n$
[5]determined as [moles APN/moles (NPCl$_2$)]*100. Yields were determined gravimetrically unless stated otherwise.
[6(a)]experimental conditions as follows: a = solvent addition as needed to keep the viscosity of the solution low enough for efficient stirring, up to a maximum of 50% (weight) solvent. b = nitrogen purge.
[6(b)]starting mixture was (NPCl$_2$)m with M = 3, and 4 where ratio of 3 to 4 was 4:1, respectively.
[7]polymer was dissolved in toluene and not isolated as a solid. Yield estimated from solution concentration.
[8]yield not determined

What is claimed is:

1. A process for the polymerization of cyclic dihalophosphazene oligomer to form linear polydihalophosphazene which comprises:
   (a) agitating under an inert gaseous atmosphere a mixture containing at least one cyclic dihalophosphazene, a polar organic solvent for said cyclic halophosphazene, a catalytic amount of a solid catalyst comprising a solid support of silica or alumina containing supported thereon a transition metal compound and an organometallic compound wherein at least a portion of the transition compound has a valence of +3 or lower, said mixture being maintained at a temperature of from about 150° to about 250° C. for a sufficient period of time to form polydihalophosphazene, and
   (b) recovering polydihalophosphazene.

2. The process of claim 1 wherein the transition metal is titanium and the metal of the organometallic compound is aluminum.

3. The process of claim 2 wherein the atom mole ratio of the aluminum ion to titanium ion present in the catalyst ranges from about 0.1 to about 100.

4. The process of claim 2 wherein the mole ratio of titanium to "NPCl$_2$" in the initial reaction mixture ranges from about $1 \times 10^{-4}$:1 to about $1 \times 10^{-2}$:1.

5. The process of claim 2 wherein the solvent is 1,2,4-trichlorobenzene.

6. The process of claim 1 wherein the source from which titanium is present is Ti(OR)$_4$ wherein R is selected from the group consisting of isobutyl, n-butyl or isopropyl.

7. The process of claim 1 wherein the cyclic dihalophosphazene corresponds to the formula (NPX$_2$)$_n$ in which n is 3 to about 7 and X is a halogen selected from the group consisting of chloride, bromide and fluoride.

8. The process of claim 7 wherein the halogen is chloride.

9. The process of claim 1 wherein the period of time is from about 3 to about 6 hours.

10. A process for the polymerization of cyclic dihalophosphazene oligomer to form linear polydihalophosphazene which comprises:
    (1) agitating under an inert atmosphere a mixture containing at least one cyclic dihalophosphazene corresponding to the formula (NPX$_2$)$_n$ wherein X is a halogen selected from the group consisting of chloride, bromide or fluoride and n is an integer from 3 to 7, a polar organic solvent for said cyclic halophosphazene, a catalytic amount of a solid catalyst comprising a solid support of silica or alumina containing supported thereon a transition metal alkoxide compound wherein the transition metal is selected from the group consisting of titanium, zirconium, hafnium, vanadium, niobium, tantalum, chromium, molybdenum, or mixtures thereof, and an organometallic compound corresponding to the formula R$_a$MX$_b$ in which M is aluminum or boron, a+b is equal to the valence of M, X is a halogen selected from the group consisting of chloride or bromide and R is a hydrocarbon selected from the group consisting of alkyl, aryl, cycloalkyl, alkaryl or arylalkyl wherein the group contains C$_1$ to C$_{20}$, wherein at least a portion of the transition compound has a valence of +3 or lower, and wherein the atom mole ratio of aluminum or boron to transition metal ranges from about 0.1 to about 100, said mixture being maintained at a temperature of from about 200° to about 220° C. for a sufficient period of time to form polydihalophosphazene, and
    (b) recovering polydihalophosphazene.

11. The process of claim 10 wherein the transition metal is titanium and the metal of the organometallic compound is aluminum.

12. The process of claim 11 wherein the atom mole ratio of the aluminum ion to titanium ion present in the catalyst ranges from about 1.0 to about 65.

13. The process of claim 11 wherein the mole ratio of titanium to NPX$_2$ in the initial reaction mixture ranges from about $8 \times 10^{-4}$:1 to about $8 \times 10^{-3}$:1.

14. The process of claim 11 wherein the titanium metal compound is Ti(OR)$_3$ and Ti(OR)$_4$ wherein R is selected from the group consisting of isobutyl, n-butyl or isopropyl.

15. The process of claim 10 wherein X in (NPX$_2$)$_n$ is chloride.

16. The process of claim 10 wherein the period of time is from about 3 to about 6 hours.

* * * * *